Dec. 15, 1931.  D. D. LEVY  1,836,258
IDENTIFICATION SEAL
Filed Nov. 15, 1928
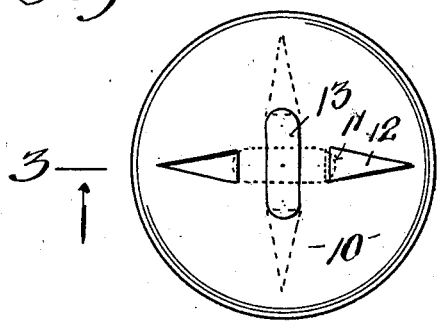
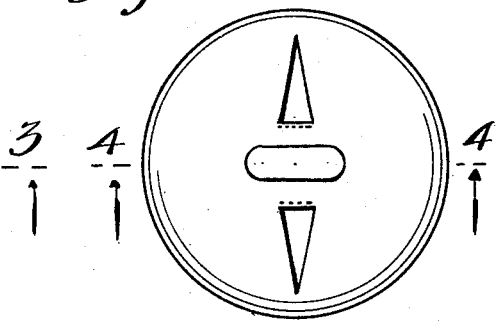
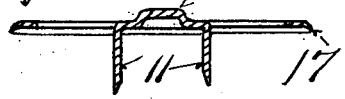
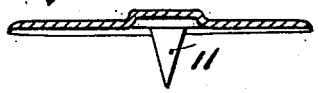
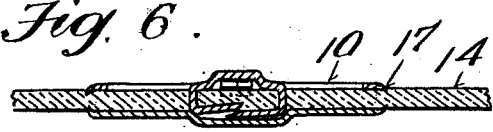
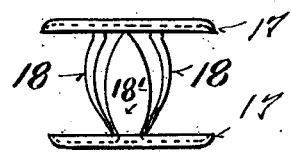
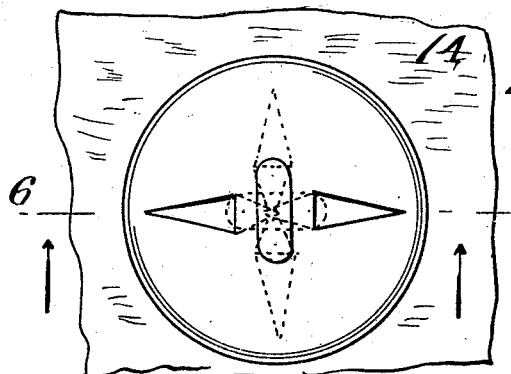
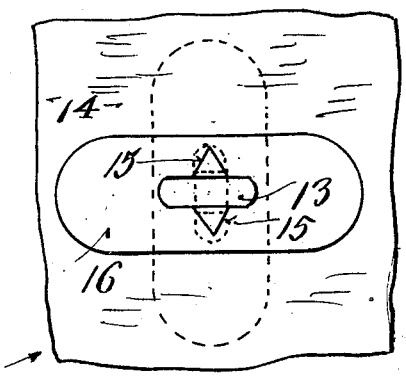
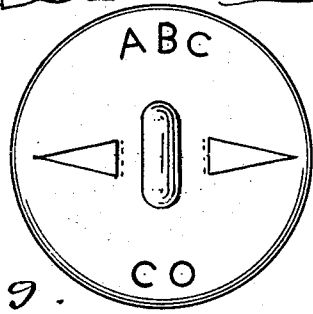
Inventor
Dudley D. Levy
By his Attorneys
Darby & Darby Patented Dec. 15, 1931

1,836,258

UNITED STATES PATENT OFFICE

DUDLEY D. LEVY, OF NEW YORK, N. Y., ASSIGNOR TO DUDLEY RESEARCH CORPORATION, OF NEW YORK, N. Y., A CORPORATION OF NEW YORK

IDENTIFICATION SEAL

Application filed November 15, 1928. Serial No. 319,467.

This invention relates to an identification seal and has for its object the provision of an effective and inexpensive seal which serves also as a tag and which cannot be removed without detection.

Another object includes the provision of seal members which when forced together through the material, such as leather, fur, textiles, and the like, will interlock in such a manner that the locking members are concealed within the seal, thereby preventing tampering, changing, or removing of the seal.

A further object resides in the provision of seal members which can be readily applied to the commodity to be marked or sealed.

Other objects will appear hereinafter and I also obtain these objects by the construction illustrated in the accompanying drawings in which—

Figure 1 is a plan view of a preferred type of seal member;

Fig. 2 is a plan view of its companion;

Fig. 3 is a view taken on the line 3—3 of Fig. 1;

Fig. 4 is a view taken on the line 4—4 of Fig. 2;

Fig. 5 is a plan view showing the seal in use;

Fig. 6 is a view taken on the line 6—6 of Fig. 5;

Fig. 7 is a view showing a slightly different form of seal in use on material;

Fig. 8 is an elevational view of a pair of seal members showing their relation when brought into position to be forced into locked seal; and Fig. 9 is a plan view illustrating the seal in use as an identification tag.

Like numerals of reference refer to similar parts throughout the several views.

In a preferred form of construction my identification seal comprises a disc or plate member 10 of suitable size and thickness so as to be readily used as a seal member on material to be identified. In place of a round disc it is obvious that the seal member may assume other shapes, one form of which is shown in Fig. 7 for example. Obviously other forms can be used for the same purpose. In a preferred form the holding members or tangs 11 are struck from the disc body and are preferably each provided with a sharpened point leaving openings 12 in the plate or disc. I further provide in the body of the disc member a boss 13. This boss is preferably oblong in shape and of sufficient length to engage the ends of the tangs when the seal members are brought together over a fur or other material 14. It is important that the position of the companion seal members be adjusted so that the tangs are immediately opposite the boss and for this purpose the two members are at right angles, as is indicated by the dotted lines in Figs. 1, 5 and 7, for example. In the latter construction the seal member or plate 16 is oblong in shape and the boss 13 may take the position shown in Fig. 7, or it may be placed transversely, that is, across the oblong plate. In any case will the tangs 11 or 15 engage the inner surface of bosses 13 to fold over and lock upon the material in such a manner as to completely hide and conceal from view the clinched prongs to thereby discourage tampering with the seal.

In Fig. 9 I have shown identification data to illustrate the use of the seal members as identification tags and when so used said identification data may appear on either or both surfaces of either or both seal members.

In the form shown in Fig. 8 the tangs 18 and 18' are integral with the body member of the seal and are not struck out from the body itself. In this construction of Fig. 8 tangs 18 extend from the upper seal member and are viewed edge-wise. Tang 18' on the other hand is viewed flatwise and extends upwards from the companion seal member 17. It is understood that for best results the opposing seal members are so placed that the tangs of said members are substantially at right angles. These tangs are moreover slight curved so as to make the right interlocking direction when the seal members are forced together. This type of seal may be made of heavier metal, if desired, and it may be useful for larger materials.

By referring to Figs. 3, 6 and 8 it will be noted that the edge 17 of the seal members is sharpened and slightly dished for the purpose of cutting into the material, as shown in Fig. 6, when the seal members are secured, thereby making it practically impossible to pry or break open the seal without detection.

It is obvious that changes in the shape of the body or in the form of the tangs will suggest themselves to those versed in the art and I do not by my specific description intend to limit myself to the exact structure shown except as herein defined and claimed.

From this disclosure it will be apparent that the seal members comprise, in a preferred form, discs, plates, or the equivalent, having tangs or locking members projecting from one surface and designed to cut through the material marked and clinch beneath the opposing members to thus lock upon each other and be completely hidden and concealed. The tangs are preferably in pairs standing substantially in parallel planes and designed to clinch beneath the opposing member. The seal members are applied so that their tangs are substantially at right angles when brought into sealing relation and forced together onto the material to be sealed and/or marked.

It will be noted that as the seal members are brought together the tangs are guided by the inner surface of the opposite bosses, where this type of seal members is used, or they will be guided by reason of their inturned prong ends, to neatly and securely fold and clinch against the inner surfaces of said seal members and upon the material sealed. Moreover, said folds and clinches are disposed at substantially right angles and are completely protected and hidden within the seal.

I claim:

1. An identification seal comprising a pair of tanged complementary plate members disposed in opposition with said tangs set at right angles to each other, and a boss along the center of each member for guiding the ends of said tangs into overlapping position when said plate members are united to form a seal.

2. An identification seal comprising a pair of tanged complementary plate members disposed in opposition, said plate members each having its peripheral edge turned toward the other plate member and arranged to bite into the material as it is tagged, and a boss in each plate to receive the tangs of its complementary member in the completed seal.

3. An identification seal comprising a pair of plate members each having a substantially flat surface with a dished edge and adapted to hug the material to which the seal is applied, said plate members each having tangs projecting therefrom within the dished edge, the inner surface of each plate member constituting means for folding said tangs in interlocking position within the seal.

4. An identification seal comprising a pair of opposing plates each having its peripheral edge dished to bite into the material sealed, tangs struck from the plates within the peripheral edge and projecting from each of said opposing plates, and means on said opposing plates for guiding the tangs when folded to form the seal.

5. A seal and tag comprising a pair of opposing seal and tag members each having a dished edge to bite into a material when said members are compressed onto the material to be sealed and pairs of tangs disposed at an angle and overlapped within the seal.

6. An identification seal comprising a pair of plate members each having a substantially flat surface bordered by a dished edge and a pair of tangs struck from the inner portion of said surface remote from said edge, the tangs of each plate member cutting through the material at substantially right angles and overlapping against the inner surface of its companion plate when the seal is affixed.

7. An identification seal member comprising a substantially flat plate having its edge dished and a pair of tangs struck from said plate and projecting therefrom near the center of the plate and extending beyond the dished edge.

8. A seal having identification indicia thereon and comprising a member having a substantially flat body portion, a rib on one side of said body portion, and a plurality of tangs arranged on the opposite sides of said rib and projecting from the opposite side of said body portion, the edge of said member being sharpened and turned up to define a continuous wall enclosing said tangs, and said tangs extending beyond the edges of said wall.

9. The combination with a piece of material of an identification seal applied thereto, said seal comprising a pair of substantially similar dished members disposed one on each side of said piece of material, each member having tangs projecting from a portion defined by the turned up edge thereof, the tangs of each member passing through the material and being interlocked with the tangs of the other member, the edge of each member being forced through the surface of the material into the body thereof.

In testimony whereof I have hereunto set my hand on this 13th day of November A. D., 1928.

DUDLEY D. LEVY.